(12) United States Patent
Förster et al.

(10) Patent No.: US 6,971,272 B2
(45) Date of Patent: Dec. 6, 2005

(54) INTEGRATED FLUID SENSING DEVICE

(75) Inventors: Karl-Heinz Förster, Dresden (DE); Frank J. Langro, Port Washington, NY (US); Frank Latino, Setauket, NY (US); Josef Binder, Huntington, NY (US); Wolfgang Benecke, Vorwerk-Buchholz (DE); Thomas Stärz, Grasberg (DE); Oliver Ahrens, East Northport, NY (US)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 11/034,703

(22) Filed: Jan. 13, 2005

(65) Prior Publication Data

US 2005/0121080 A1   Jun. 9, 2005

Related U.S. Application Data

(60) Division of application No. 10/634,606, filed on Aug. 5, 2003, which is a continuation-in-part of application No. 09/666,990, filed on Sep. 21, 2000, now Pat. No. 6,619,142.

(51) Int. Cl.$^7$ ............................................. G01F 1/28
(52) U.S. Cl. ................................... 73/861.74; 137/884
(58) Field of Search .................. 73/861.74, 202.5, 73/204.11, 884, 269; 137/560, 561 A, 562, 137/557; 251/367

(56) References Cited

U.S. PATENT DOCUMENTS

| | | |
|---|---|---|
| 3,340,733 A | 9/1967 | Lasher |
| 3,424,000 A | 1/1969 | Chelner et al. |
| 3,927,565 A | 12/1975 | Pavlin et al. |
| 4,565,098 A | 1/1986 | Herzl |
| 4,729,244 A | 3/1988 | Furuse |
| 4,875,932 A | 10/1989 | Uchiyama et al. |
| 4,986,127 A | 1/1991 | Shimada et al. |
| 5,000,226 A | 3/1991 | Stoll et al. |
| 5,144,843 A | 9/1992 | Tamura et al. |
| 5,187,984 A | 2/1993 | Mosser et al. |
| 5,259,248 A | 11/1993 | Ugai et al. |
| 5,348,047 A | 9/1994 | Stoll et al. |
| 5,383,470 A | 1/1995 | Kolbly |
| 5,458,048 A | 10/1995 | Hohner |

(Continued)

FOREIGN PATENT DOCUMENTS

DE          3732856          4/1989

(Continued)

OTHER PUBLICATIONS

Jorensen, Finn E., "How to Measure Turbulence with Hot-Wire Aneomometers", Dantec Dynamics, Publication No. 9040U6151, Feb. 1, 2002.

*Primary Examiner*—Edward Lefkowitz
(74) *Attorney, Agent, or Firm*—Hoffmann & Baron, LLP

(57) ABSTRACT

A circuit board, which includes one or more sensors, is integrated in a fluid control device, such as a valve manifold and a base plate. The fluid control device selectively directs a fluid used to control pneumatic or hydraulic equipment. The sensors are used to measure physical characteristics of the fluid, such as flow rate, pressure, and temperature. A flow sensor includes a paddle and a support member. The paddle is disposed at least partially in an orifice and is displaced in response to fluid flow. The support member positions the paddle in the orifice and includes a plurality of strain gauges. The strain gauges are disposed on only one side of the support member and are mechanically stressed in response to the paddle being displaced by the fluid flow.

26 Claims, 16 Drawing Sheets

U.S. PATENT DOCUMENTS

| | | |
|---|---|---|
| 5,463,904 A | 11/1995 | Kalinoski |
| 5,469,749 A | 11/1995 | Shimada et al. |
| 5,495,769 A | 3/1996 | Broden et al. |
| 5,511,428 A | 4/1996 | Goldberg et al. |
| 5,546,794 A | 8/1996 | Kuhn et al. |
| 5,551,283 A | 9/1996 | Manaka et al. |
| 5,663,508 A | 9/1997 | Sparks |
| 5,717,147 A | 2/1998 | Basch et al. |
| 5,791,369 A | 8/1998 | Nishino et al. |
| 5,820,262 A | 10/1998 | Lechner |
| 5,868,159 A | 2/1999 | Loan et al. |
| 5,883,310 A | 3/1999 | Ho et al. |
| 5,899,962 A | 5/1999 | Louwagie et al. |
| 5,965,813 A | 10/1999 | Wan et al. |
| 6,023,969 A | 2/2000 | Feller |
| 6,295,874 B1 | 10/2001 | Strutt et al. |
| 6,408,698 B1 | 6/2002 | Brereton et al. |
| 6,443,328 B1 | 9/2002 | Fehl et al. |
| 6,470,741 B1 | 10/2002 | Fathollahzadeh |
| 6,561,216 B2 | 5/2003 | Kurosawa |
| 6,615,867 B2 | 9/2003 | Tajima et al. |
| 6,631,638 B2 | 10/2003 | James et al. |
| 2003/0159697 A1 | 8/2003 | Wallace |

FOREIGN PATENT DOCUMENTS

| | | |
|---|---|---|
| DE | 19502499 A1 | 8/1996 |
| EP | 0087621 | 8/1983 |
| EP | 0305134 | 3/1989 |
| EP | 0319871 | 6/1989 |
| EP | 0381775 A1 | 8/1990 |
| EP | 0561365 A2 | 9/1993 |
| EP | 1365216 A1 | 11/2003 |
| JP | 3-18735 | 1/1991 |

INTEGRATED FLUID SENSING DEVICE

CROSS-REFERENCE TO RELATED APPLICATIONS

This application is a divisional of co-pending U.S. application Ser. No. 10/634,606, filed Aug. 5, 2003, which is a continuation-in-part of U.S. application Ser. No. 09/666,990 filed Sep. 21, 2000, which issued as U.S. Pat. No. 6,619,142 on Sep. 16, 2003, the disclosure of which are incorporated herein by reference.

BACKGROUND OF THE INVENTION

1. Field of the Invention

This invention relates generally to pneumatic and hydraulic equipment, and more particularly to the measurement of physical characteristics, such as flow rate, pressure, and temperature of a fluid used to control these devices.

2. Description of the Prior Art

A fluid flow device, such as a valve manifold 10 and its corresponding base plate 12 shown in FIG. 1, is used to accurately direct fluids used to-control pneumatic and/or hydraulic equipment. Fluid flow devices and other control devices are disclosed in U.S. Pat. No. 5,348,047 to Stoll, et al. and U.S. Pat. No. 5,458,048 to Hohner, which are incorporated herein by reference. The term "fluid" is generically used herein to refer to any gas, liquid, suspension, and/or slurry used as a control medium in such equipment.

The base plate 12 is mounted to a bottom surface of the valve manifold 10, as shown by dashed lines in FIG. 1. The base plate 12 includes channels 16, which pass through the base plate 12 and coincide with apertures on the underside of the fluid flow device 10. A fitting 14 is fitted to one end of each of the channels 16. The fittings 14 can readily be connected to tubes that direct the fluid to and/or from the valve manifold 10. The channels 16 then direct the fluid through the base plate 12 to he appropriate aperture in the valve manifold 10. The valve manifold 10 can then redirect or modify the flow of fluid in response to electronic control. In addition to directing the flow of fluid, another function that may be performed is the measurement of fluid characteristics, such as flow rate, pressure, and temperature.

To incorporate the flow sensor shown in FIGS. 2a, 2b, and 2c in conventional fluid flow devices, additional tubing, fittings, and connectors must be spliced into the network of tubes coupling the base plate 12 to and from the source of the fluid and portions of the equipment to be controlled. The additional tubes, fittings, and connectors increase measurement error, space requirements, and the cost of installing and maintaining the equipment. In addition, the electronics that monitor the sensors require a substantial amount of additional wiring, which adds to the clutter of the resulting system and severely degrades its reliability. Further, the sensors and associated electronics, by being externally located to the fluid flow device, are inherently unprotected from environmental hazards, such as shock, dust, and pollutants, which are common in and around hydraulic and/or pneumatic equipment.

U.S. Pat. No. 3,424,000 to Chelner et al. (Chelner) describes a flow sensor, which includes four (4) strain gauges mounted on both the front and rear sides of a wafer. The wafer is deflected in response to fluid flow and provides a substrate for mounting strain gauges, electrical conductors, and contacts.

However, to modify the sensitivity of the Chelner flow sensor, the substrate for the electrical components must be modified, which has a significant impact on the deposition of electrical components thereon, and thus the overall manufacturing and standardization process. In addition, the double-sided placement of strain gauges on the wafer substantially complicates and adds to the cost of passivation and production of such flow sensors.

OBJECTS AND SUMMARY OF THE INVENTION

It is an object of the present invention to provide an integrated fluid sensing device, which significantly reduces measurement errors, space requirements, and the cost of installing and maintaining sensors that measure the physical characteristics of a fluid used to control hydraulic or pneumatic equipment.

It is a further object of the present invention to provide an integrated fluid sensing device, which includes sensors mounted on a single circuit board having common signal processing, communication, error control, and connecting circuitry.

It is still a further object of the present invention to provide an integrated fluid sensing device, which can readily be adapted to various physical characteristics of a fluid used to control hydraulic or pneumatic equipment by changing a single circuit board.

It is yet a further object of the present invention to provide an integrated fluid sensing device, which can readily display and transmit sensed data, via wired or wireless means, which represents physical characteristics of a fluid used to control hydraulic or pneumatic equipment.

It is still another object of the present invention to provide an integrated fluid sensing device that significantly reduces the amount of external tubing, connectors, and fittings required to sense the physical characteristics of a fluid used in the control of hydraulic or pneumatic equipment.

It is yet another object of the present invention to provide an integrated fluid sensing device, which substantially encloses sensors that measure the physical characteristics of a fluid and protects these sensors against environmental hazards.

It is another object of the present invention to provide a flow sensor, which can readily be adapted to different flow rates without any substantial change or additional cost in the manufacturing process.

It is yet another object of the present invention to provide a flow sensor, in which a generic support member includes one or more strain gauges.

It is still another object of the present invention to provide a flow sensor, in which a paddle that is displaced by fluid flow does not include a strain gauge.

It is a further object of the present invention to provide a flow sensor, in which a support member includes strain gauges on only one side of the of the support member.

In accordance with the present invention, an integrated fluid sensing device is provided, which includes a fluid flow device and a circuit board. The fluid flow device includes a first mating portion and a second mating portion. The first mating portion includes a first aperture, and the second mating portion includes a second aperture. The first aperture and the second aperture are at least partially aligned such that the first aperture and the second aperture define a first channel through the first and second, mating portions when the first and second mating portions are joined together. The first channel is able to communicate fluid therethrough. The circuit board is disposed between the first mating portion and the second mating portion and includes at least one sensor. The sensor is at least partially aligned with the first channel and is able to detect a physical characteristic of the fluid flowing through the first channel.

In further accordance with the present invention, a method of integrating a sensor in a fluid flow device is provided, which includes the steps of dividing the fluid flow device into a first mating portion and a second mating portion, and positioning a circuit board between the first mating portion and the second mating portion. The first mating portion including a first aperture, and the second mating portion including a second aperture. The first aperture and the second aperture are at least partially aligned such that the first aperture and the second aperture define a first channel through the first and second portions when the first and second mating portions are joined together. The first channel is able to communicate a fluid therethrough. The circuit board includes at least one sensor, which is at least partially aligned with the first channel. The sensor is able to detect a physical characteristic of the fluid flowing through the first channel.

In still further accordance with the present invention an integrated fluid sensing device is provided, which includes at least one valve, a base plate, and a circuit board. The base plate is removably coupled to the valve and includes a first mating portion and a second mating portion. The base plate includes a first channel through the first and second mating portions when the first and second mating portions are joined together. The circuit board is disposed between the first mating portion and the second mating portion. The circuit board includes at least one sensor and an electrical contact. The electrical contact is coupled to the sensor and is accessible to an exterior of the fluid flow device when the first and second portions are joined together. The sensor is at least partially aligned with the first channel and is able to detect a physical characteristic of the fluid flowing through the first channel.

In yet further accordance with the present invention, a flow sensor is provided, which includes a paddle and a support member. The paddle is disposed at least partially in an orifice and is displaced in response to fluid flow. The support member positions the paddle in the orifice and includes a plurality of strain gauges. The strain gauges are disposed on only one side of the support member and are mechanically stressed in response to the paddle being displaced by the fluid flow.

In accordance with the present invention, a method of sensing flow is provided, which includes the steps of disposing a paddle at least partially in an orifice, directing a fluid flow through the orifice, positioning the paddle in the orifice by a support member, and disposing the plurality of strain gauges on only one side of the support member. The paddle is displaced in response to the fluid flow. The support member includes a plurality of strain gauges and the plurality of strain gauges are mechanically stressed in response to the paddle being displaced by the fluid flow.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 4b is a side, cross-sectional view of one channel in the base plate shown in FIG. 4a.

DETAILED DESCRIPTION OF THE PREFERRED EMBODIMENTS

Figure 2A:
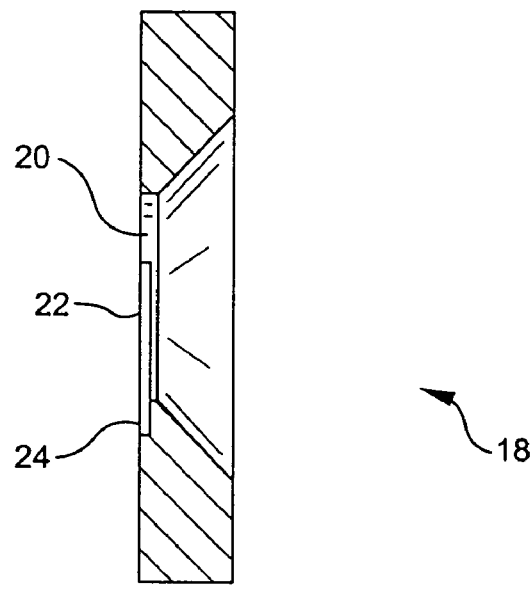
FIGS. 2a and 2b are side views of a flow sensor.
Figure 2B:
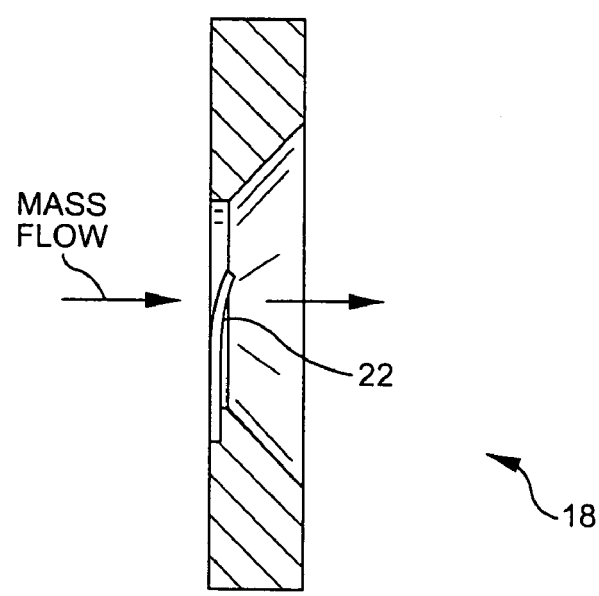
Figure 2C:
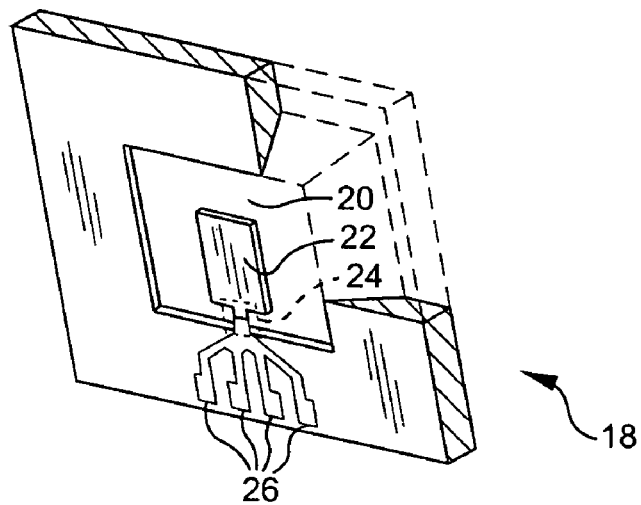
FIG. 2c is an isometric view of the flow sensor shown in FIGS. 2a and 2b.

One type of sensor 18, which is used to measure the flow of liquid, is shown in FIGS. 2a, 2b, and 2c. The flow sensor 18 includes an orifice 20, a cantilever paddle structure 22, and an implanted piezo-resistive Wheatstone bridge 24. FIG. 2a shows the paddle structure 22 in an undeflected state, and FIG. 2b shows the paddle structure 22 in a deflected state.

The fluid to be measured is directed through the orifice 20 in the flow sensor 18. The dynamic pressure built up by the fluid deflects the paddle structure 22. The mechanical stress of the paddle structure 22 changes the resistance of the piezo-resistive Wheatstone bridge 24 at the base of the paddle structure 22, and this change in resistance creates a corresponding change in voltage. The change in voltage is detected on a set of contacts 26 electrically connected to the Wheatstone bridge 24, as shown in FIG. 2c. For temperature compensation, a second Wheatstone bridge is preferably positioned on the flow sensor 18 surrounding the orifice 20. A support member preferably positions the paddle structure 22. The size of the support member is preferably minimized to concentrate the mechanical stress of deflection, and thus increase the sensitivity of the flow sensor 18. Furthermore, the overall size of the flow sensor is determined by the paddle size, which can be adjusted to the specific needs of the control task.

The output voltage of the Wheatstone bridge 24 is proportional to the square of the volumetric flow rate. The sensitivity of the flow sensor 18 is dependent upon the size of the orifice 20, and is adjustable over a broad range. Thus, since the paddle structure 22 is perpendicularly oriented to the direction of flow of liquid, as liquid passes through the orifice 20 in the flow sensor 18, the kinetic pressure of the liquid induces a mechanical stress that is detected by the piezo-resistors in the Wheatstone bridge 24.

Figure 1:
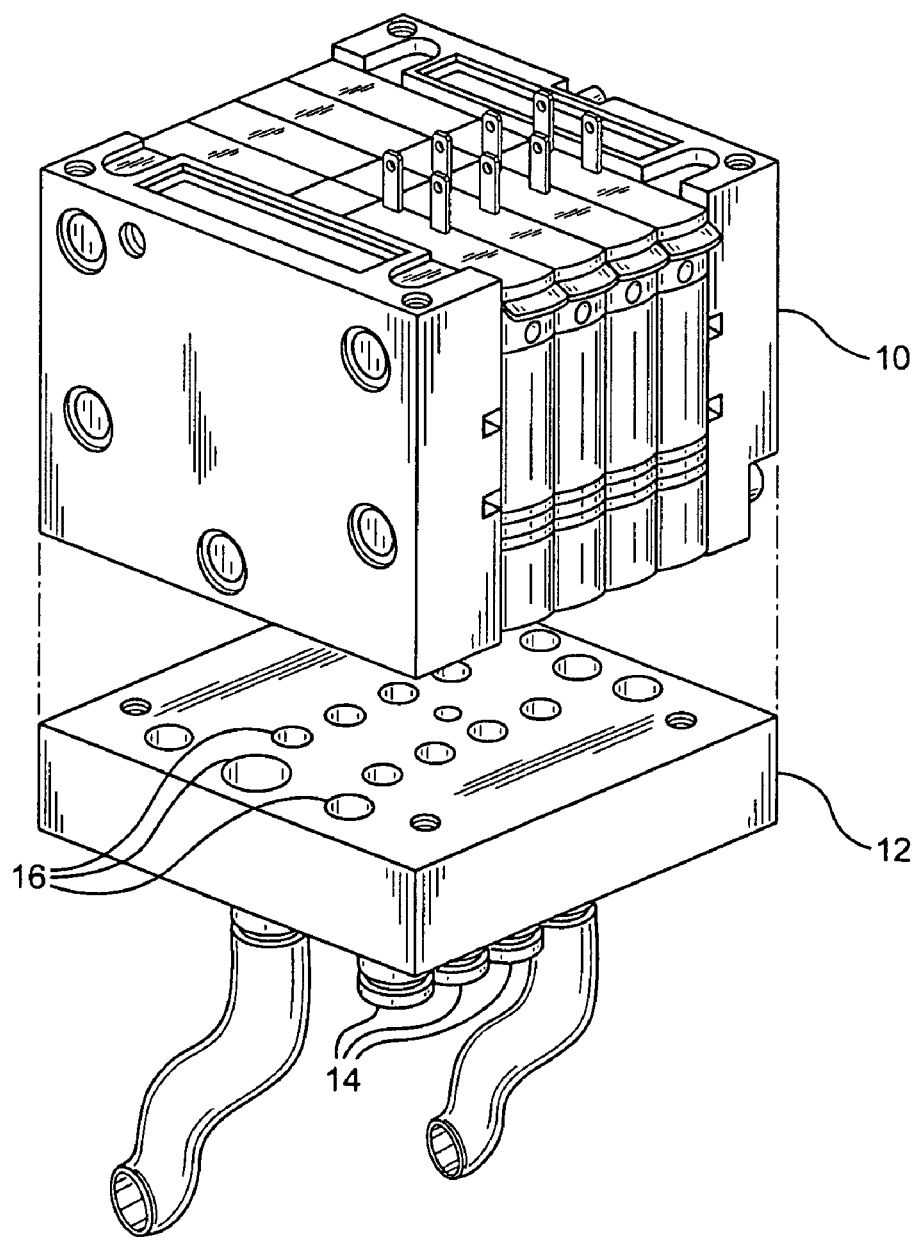
FIG. 1 is an isometric view of a conventional fluid control device including a valve manifold and a base plate.
Figure 3A:
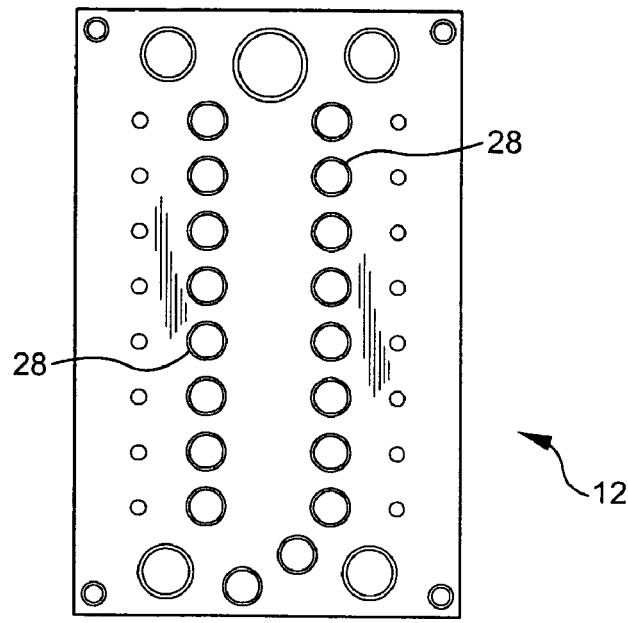
FIGS. 3a and 3b are bottom, and top views, respectively, of the conventional base plate shown in FIG. 1.

FIG. 3a shows a bottom view of a multipole or base plate 12. Threaded holes 28 are provided in the base plate 12 to accommodate fittings 14 as shown in FIG. 1. The fittings 14 enable tubes (not shown) to be connected to the base plate 12. The base plate 12 is preferably manufactured as a separate unit from the valve 10 shown in FIG. 1 so that the valve manifold 10 can be removed from the base plate 12 without disturbing the tubes connected to the base plate 12.

Figure 3B:
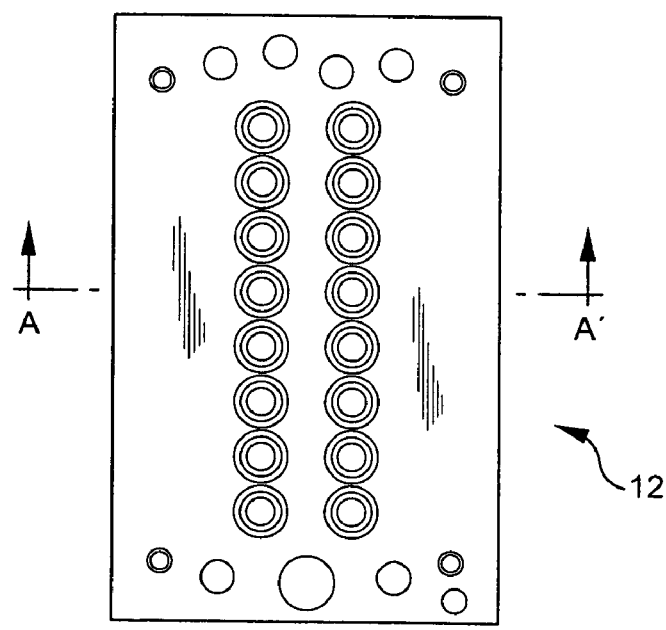
Figure 3C:
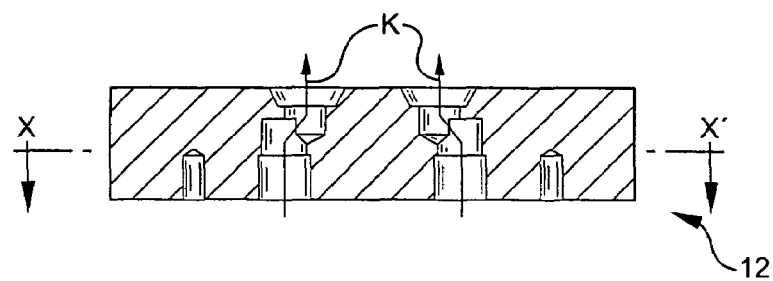
FIG. 3c is a side, cross-sectional view of the base plate shown in FIG. 3b taken along the line A–A'.

FIG. 3b shows a top view of the conventional base plate 12 including a line A–A'. FIG. 3c shows a side, cross-sectional view of the base plate 12 taken across the line A–A'. The arrows K in FIG. 3c indicate the flow of fluid through the channel in the base plate 12. As is best seen from FIG. 3C, the apertures in the top of the base plate 12 are preferably offset from the corresponding apertures in the bottom of the base plate 12. This offset diverts the flow of fluid through the channel, which limits the pressure of the fluid as it comes in contact with components in the valve manifold 10.

Figure 4A:
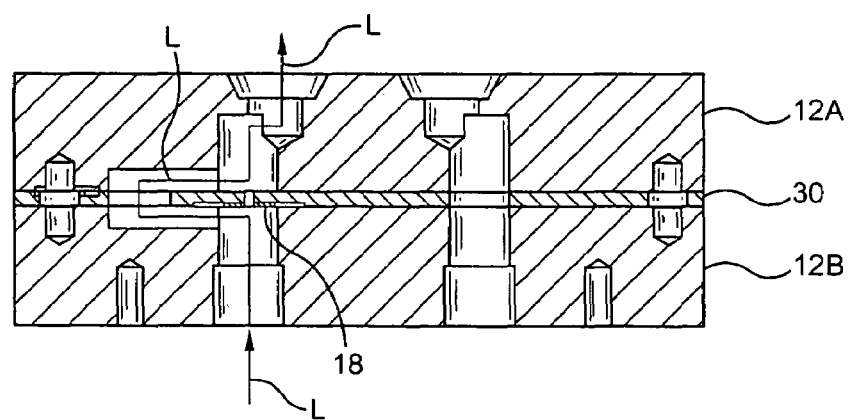
FIG. 4a is a side, cross-sectional view of the base plate in which a circuit board has been inserted between an upper portion and a lower portion of a base-plate in accordance with the present invention.

FIG. 4a shows a side, cross-sectional view of the base plate 12 after it has been separated into an upper portion. 12A and a lower portion 12B along a line X–X' shown in FIG. 3c. A circuit board 30, which includes at least one sensor 18, is inserted between the upper and lower portions of the base plate. An arrow L indicates the flow of fluid through the channel and through the sensor 18. A bypass path L' is preferably provided to divert the majority of flow around the sensor 18. The bypass path L' reduces the flow through the sensor 18, which protects sensitive components in the sensor 18 that are subject to wear and breakage. About 10–15% of the total flow of fluid is preferably allowed to pass through the sensor 18. The remaining flow is diverted around the sensor 18 and through the bypass path L'.

Figure 4B:
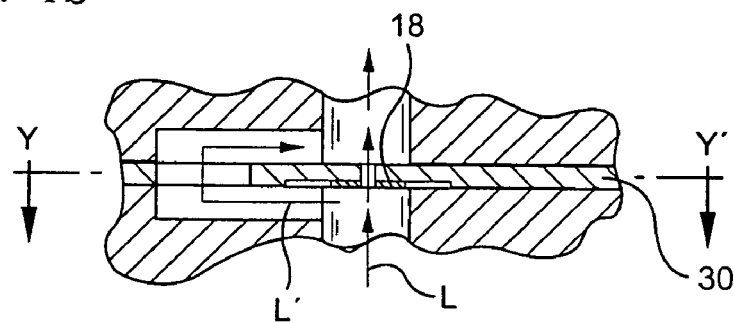
Figure 4C:
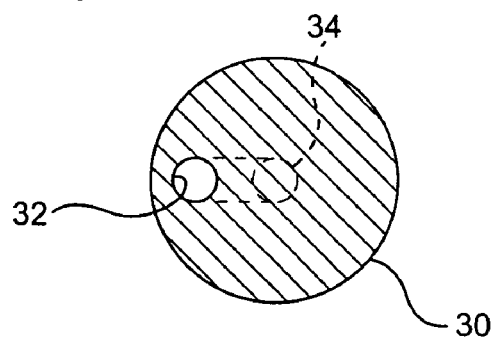
FIG. 4c is a top, cross-sectional view of the base plate shown in FIG. 4b taken along the line Y–Y'.

FIG. 4b shows a side, cross-sectional view of the base plate portions 12A, 12B and the circuit board 30 in which the bypass path L' has been implemented around the sensor 18. FIG. 4c is a top, cross-sectional view of the circuit board taken along cross-section line Y–Y' showing an orifice 32 for the bypass path L' and an orifice 34, which allows the flow of fluid through the sensor 18.

Figure 4D:
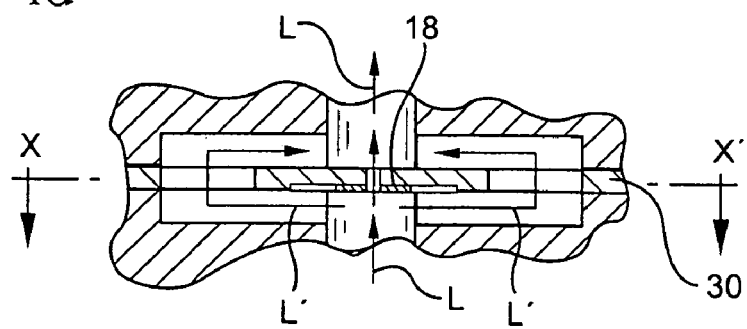
FIG. 4d is a side, cross-sectional view of one channel in an alternative embodiment of the base plate formed in accordance with the present invention.
Figure 4E:
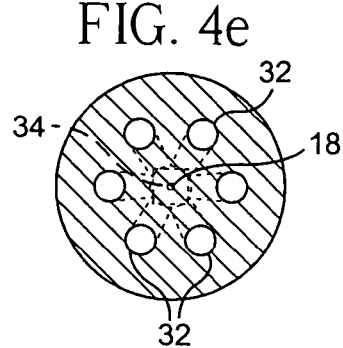
FIGS. 4e and 4f are top, cross-sectional views of two embodiments of the base plate shown in FIG. 4d taken along the line X–X'.
Figure 4F:
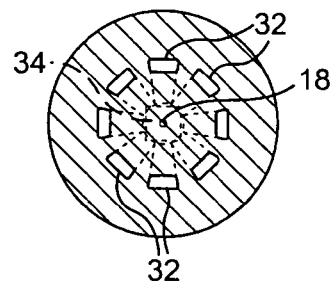

FIG. 4d shows an alternative geometry for the channel in the base plate 12 having at least two (2) bypass paths L'. FIGS. 4f and 4e show top, cross-sectional views of the circuit board 30 taken along cross-section line X–X' shown in FIG. 4d. The circuit board 30 in FIG. 4e accommodates six (6) bypass paths L', and the circuit board 30 in FIG. 4f accommodates eight (8) bypass paths L'.

Figure 4G:
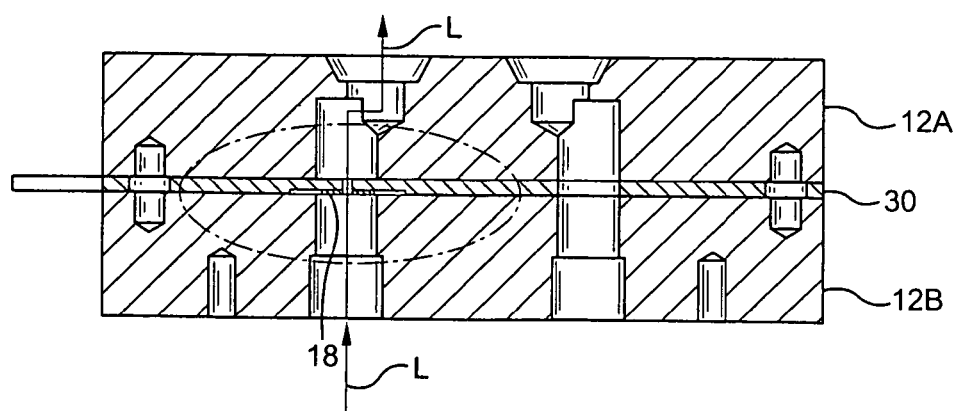
FIG. 4g is a side, cross-sectional view of one channel in an alternative embodiment of the base plate formed in accordance with the present invention without a bypass channel directing flow around the sensor.

By appropriate dimensioning of the sensor 18, the channel may be constructed without a bypass channel directing flow around the sensor 18. FIG. 4g shows a side, cross-sectional view of the base plate portions 12A, 12B and the circuit board 30 in which a bypass path has not been implemented around the sensor 18. Thus, in the embodiment shown in FIG. 4g, about 100% of the flow is directed through the sensor 18.

Figure 5A:
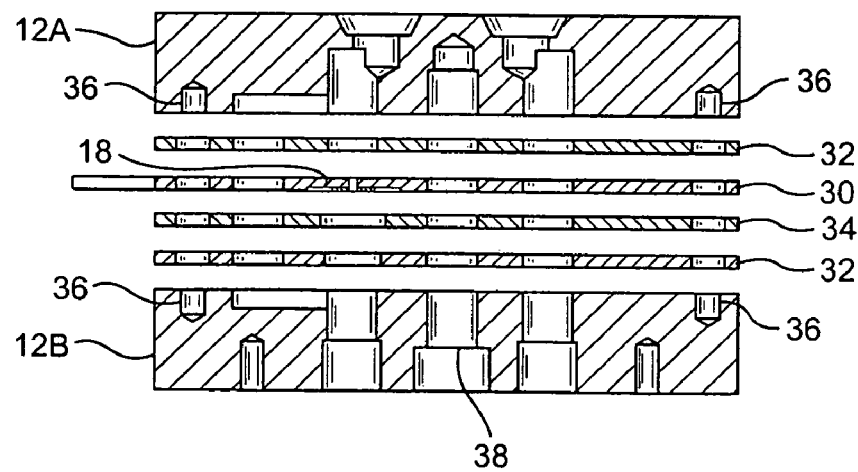
FIGS. 5a and 5b are partially-exploded, side, cross-sectional views of two embodiments of the base plate formed in accordance with the present invention.

FIG. 5A shows an alternative embodiment of the base plate, which incorporates four (4) layers between the upper portion 12A and the lower portion 12B of the base plate 12. An upper sealing layer 32A and a lower sealing layer 32B are preferably inserted above and below the circuit board 30, respectively. The sealing layers are preferably manufactured from a pliable and/or deformable material, such as rubber, which substantially prevents leakage of the fluid from the channel. Leakage is particularly prevalent between the hard surfaces of the circuit board 30 and the base plate 12A. In addition, a spacing layer 34 is preferably inserted above or below the circuit board 30 to protect the sensitive components and contacts on the circuit board 30. The spacing layer 34 may be separate from or integrated with the circuit board 30.

In addition, one or more alignment, holes 36 are preferably provided through each of the layers 30, 32, and 34 and partially through the upper portion 12A and the lower portion 12B of the base plate. A guide pin (not shown) is preferably placed in each of the alignment holes, which ensures a preferably unique orientation of the layers 30, 32, and 34 with the portions of the base plate 12A, 12B as they are joined together.

Figure 5B:
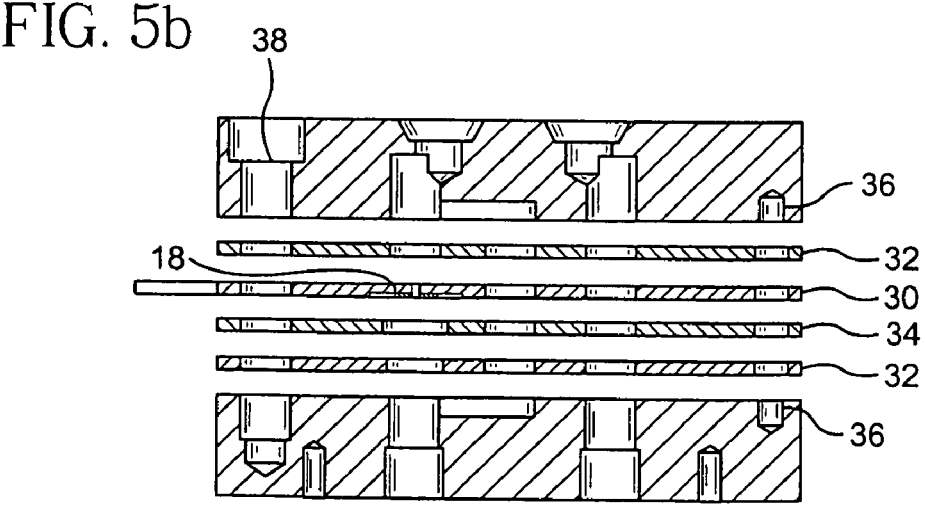

One or more screw holes 38 are provided through the bottom portion 12B of the base plate, each of the layers 30, 32, 34, and partially through the upper portion 12A of the base plate to accommodate a screw, which joins the portions of the base plate together and sandwiches the layers. The screw maintains compression between the portions of the base plate, which aids in preventing leakage of fluid from the channel. FIG. 5b shows an alternative embodiment of the base plate 12 shown in FIG. 5a, in which the screw hole 38 has been relocated nearer an external surface of the base plate.

Figure 6A:
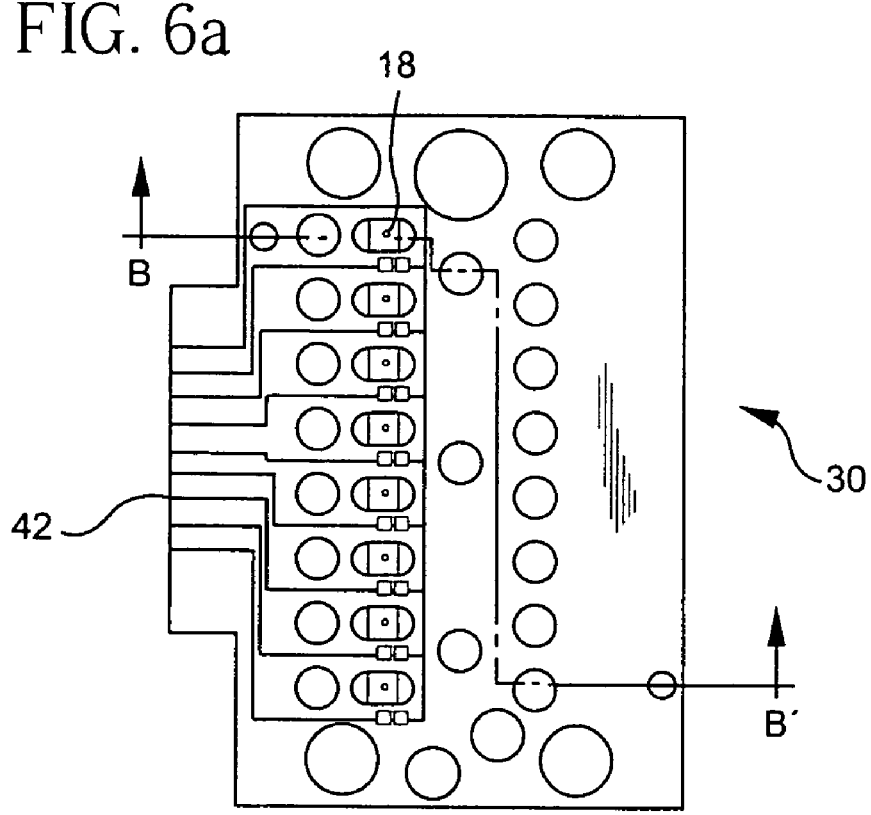
FIG. 6a is a top view of a circuit board.

FIG. 6a shows the circuit board 30 with eight (8) sensors 18. Each of the sensors 18 is preferably positioned within a depression on the circuit board 30 and affixed to the circuit board 30 by an adhesive, surface mount technology (SMD), wire bond technology, flip-chip technology, or the like. The sensor 18 is preferably connected to bond pads 40, which are coupled to electrically conductive traces 42 on the circuit board 30. The traces 42 are brought to the edge of the board, which is preferably accessible from the outside of the base plate 12 when the upper portion 12A and the lower portion 12B of the base plate 12 are joined together.

The sensors 18 are advantageously encapsulated within and electrically accessible outside the integrated fluid sensing device formed in accordance with the present invention. Thus, the fragile components of the sensor 18 are inherently protected from shock, humidity, dust, corrosive chemicals, and other environmental hazards.

Figure 6B:
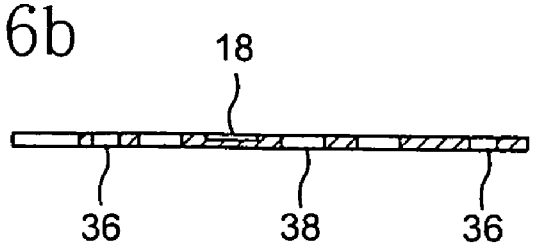
FIG. 6b is a side, cross-sectional view of the circuit board shown in FIG. 6a taken along the line B–B'.
Figure 6C:
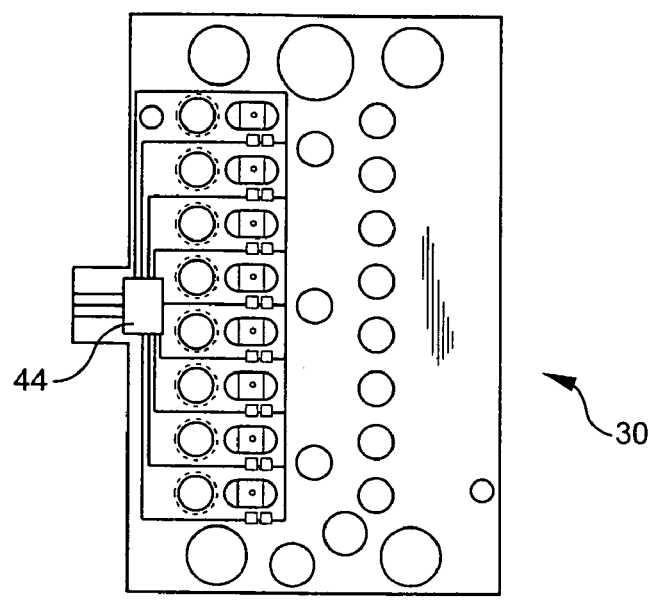
FIG. 6c is an alternative embodiment of the circuit board shown in FIG. 6a, which includes an application-specific integrated circuit (ASIC).

FIG. 6b is a side, cross-sectional view of the circuit board 30 taken along the line B–B', which shows the alignment holes 36, screw hole 38 and sensor 18. FIG. 6c shows an alternative embodiment of the circuit board 30 shown in FIG. 6a, which includes a microprocessor, a microcontroller, or an application-specific integrated circuit (ASIC) 44. The ASIC 44 monitors and processes signals from each of the sensors 18 and outputs the processed information externally to the base plate 12. The ASIC 44 may include circuitry that enables it to interface to Fieldbus compatible components and controllers.

Fieldbus is a commercial standard describing a digital, serial, multi-drop, two-way communication link, which interconnects measurement and control equipment such as sensors, actuators, and controllers. It serves as a Local Area Network (LAN) for instruments used in process control and manufacturing automation applications and has a built-in capability to distribute the control application across the network.

Figure 6D:
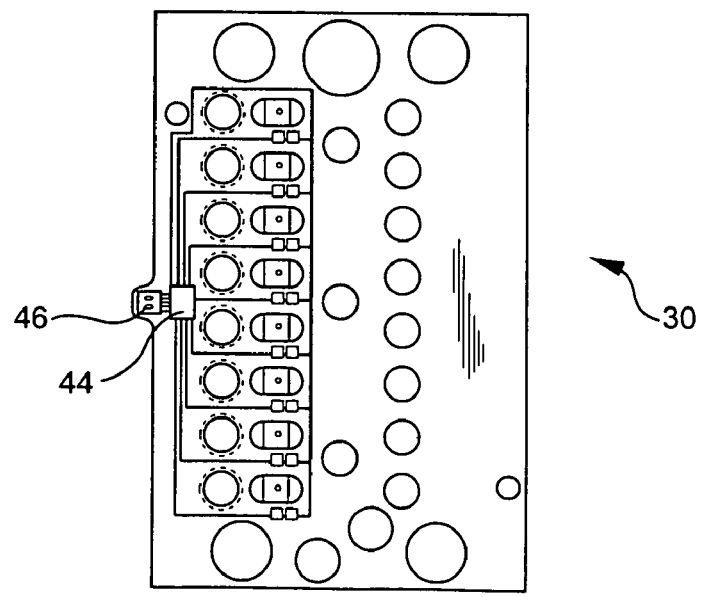
FIG. 6d is an alternative embodiment of the circuit-board shown in FIG. 6c, which includes a telemetric unit for wireless transmission of sensor data.

FIG. 6d shows an alternative embodiment of the circuit board 30 shown in FIG. 6C, in which, in addition to the ASIC 44, a telemetric unit 46 is provided for the wireless transmission of information processed by the ASIC 44. The telemetric unit 46 preferably inputs a signal from each of the sensors 18, which is representative of the sensed physical characteristic and outputs a wireless signal, such as a radio frequency or infrared signal.

Figure 7A:
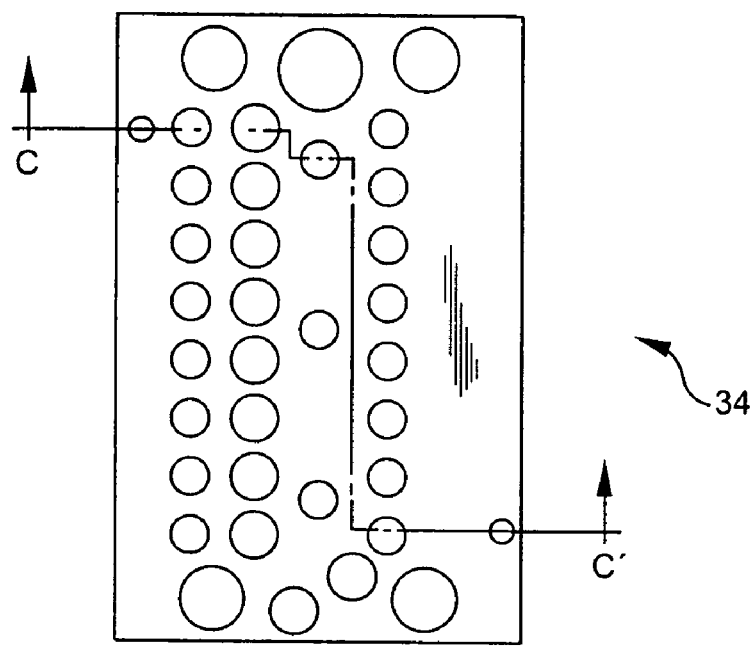
FIG. 7a is a top view of a spacing layer.
Figure 7B:
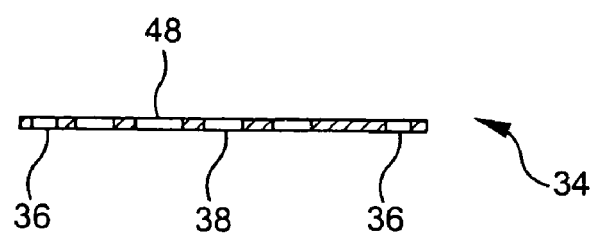
FIG. 7b is a side, cross-sectional view of the spacing layer shown in FIG. 7a taken along the line C–C'.

FIG. 7a shows a top view of the spacing layer 34, which is also shown in FIGS. 5a and 5b. The spacing layer 34 is preferably used to protect the sensitive components of the sensor 18 and the bond pads 40, which electrically connect the sensor 18 to the edge of the circuit board 30. The spacing layer 34, is preferably sealed by an appropriate choice of pliable material deposited on the spacing layer 34 or by inserting an additional sealing layer between the spacing layer 34 and the circuit board 30. Bumps and/or recesses may be integrated onto the spacing layer 34 to further protect corresponding sensors 18 and bond pads 40 on the circuit board 30. The bumps or recesses may alternatively be incorporated on the circuit board 30 without requiring a separate spacing layer 34. FIG. 7b is a side, cross-sectional view of the spacing layer 34 taken along line C–C', which shows the alignment holes 36, the screw hole 38, and an aperture 48 for the sensor 18.

Figure 8A:
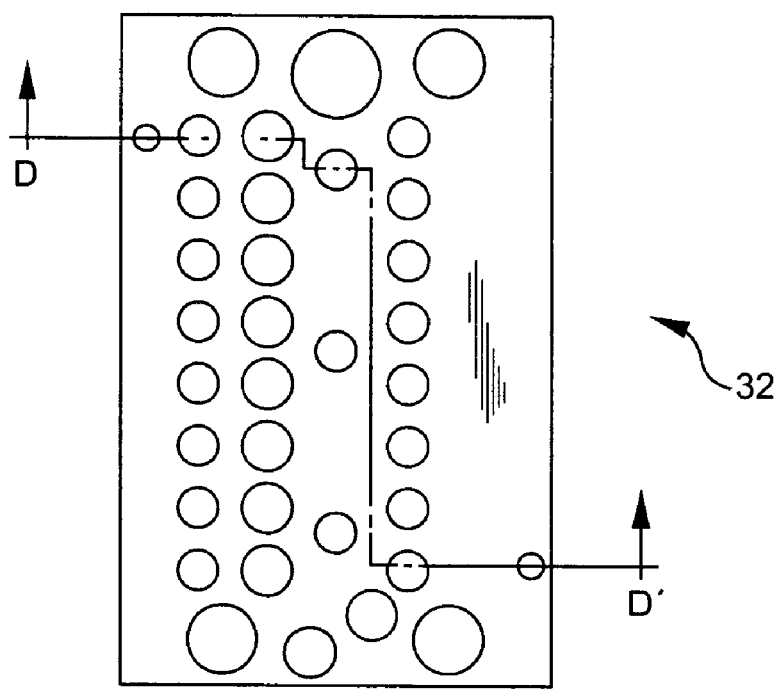
FIG. 8a is a top view of a sealing layer.
Figure 8B:
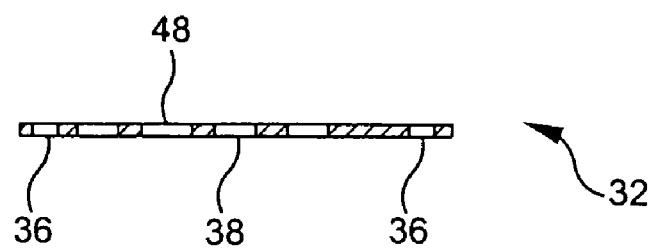
FIG. 8b is a side, cross-sectional view of the sealing layer shown in FIG. 8a taken along the line D–D'.

FIG. 8a shows the sealing layer 32, which prevents leakage from the channel to the exterior of the base plate 12. The functionality of the sealing layer 32 could alternatively be incorporated into the circuit board 30 by applying, for instance, independent seals around each of the orifices in the circuit board 30. FIG. 8b is a side, cross-sectional view of the sealing layer 32 taken across the line D–D', which shows the alignment holes 36, the screw hole 38, and the aperture 38 for the sensor 18.

Figure 9:
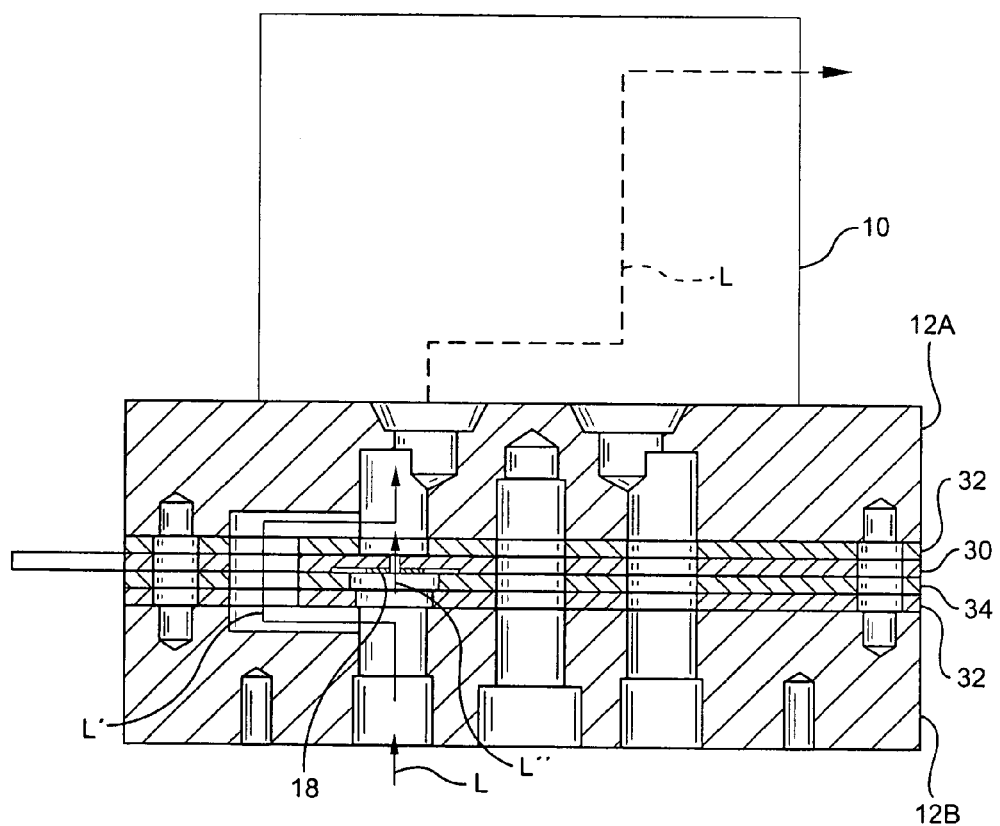
FIG. 9 is a side, cross-sectional view of the integrated fluid sensing device formed in accordance with the present invention.

FIG. 9 shows the integrated fluid flow device formed in accordance with the present invention. The circuit board 30, which includes one or more sensors 18 is sandwiched between the upper portion 12A and the lower portion 12B of the base plate. The primary flow of fluid within the channel is indicated by arrow L, which is preferably diverted around the sensor 18 through the bypass path L'. A small portion L" of the primary flow L flows through the sensor 18 and continues through the channel into the upper portion 12A of the base plate. Once the fluid exits the upper portion 12A, it is preferably outputted to pneumatic components, such as pneumatically actuated cylinders or valves.

It is anticipated that the integrated fluid sensing device of the present invention can be implemented with any quantity of valves or manifolds used to control hydraulic and/or pneumatic equipment. It is also anticipated that the sensor can measure any conceivable physical characteristic of the fluid, such as temperature, flow rate, pressure, and the like. It is further anticipated that the sensor can be implemented as alternative types of transducers, such as a magnetic flowmeter, hot-wire anemometer, bimetallic strip, thermocouple, pressure cell, or pressure transducer. Additional details concerning transducers can be found in S. Wolf, "Guide to Electronic Measurements, and Laboratory Practice", Prentice-Hall, Inc., pp. 414–451, (1973), which is incorporated herein by reference.

Figure 2D:
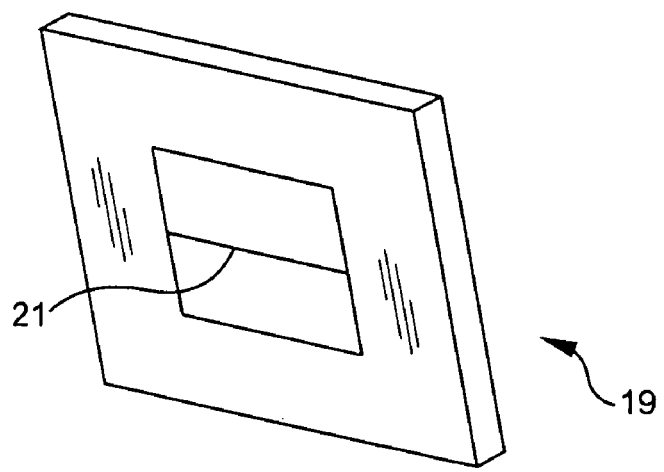
FIG. 2d is an isometric view of a conventional hot-wire anemometer.

The hot-wire anemometer 19 is shown in FIG. 2d and includes a fine resistive wire 21, which is heated by a current passing through it. If a cooler fluid flows past the wire 21, the fluid removes heat from the wire 21. The rate of heat transfer varies with the type of fluid, but it also tends to vary as the square root of the velocity at which the fluid flows past the wire 21. If the current in the wire 21 is kept constant, the change in resistance due to the cooling will yield a voltage signal, which can be monitored to indicate flow rate. Since the diameter of the wire 21 can be made very small, the anemometer 19 can be made very sensitive and responsive to high-frequency changes in the flow rate.

Figure 10:
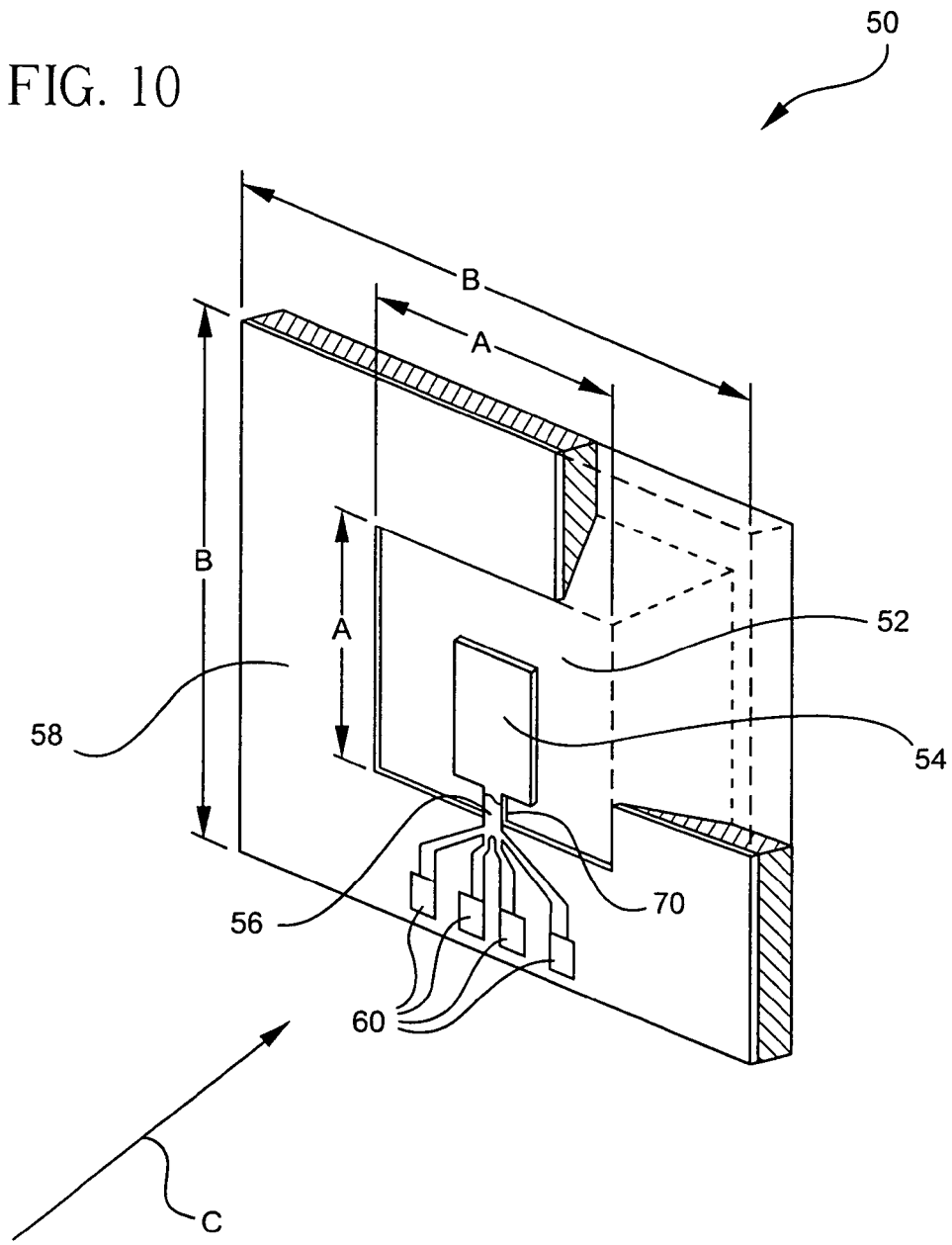
FIG. 10 is an isometric cross-sectional view of a flow sensor formed in accordance with the present invention.

A flow sensor 50 formed in accordance with the present invention, which is used to measure the flow of fluid is shown in FIG. 10. The paddle 54 is preferably mechanically coupled to that portion 58 of the flow sensor 50 surrounding an aperture or orifice 52 by a bender or support member 56. The support member 56 preferably positions the paddle 54 in the orifice 52 and includes an implanted piezo-resistive full Wheatstone bridge 70.

Figure 12:
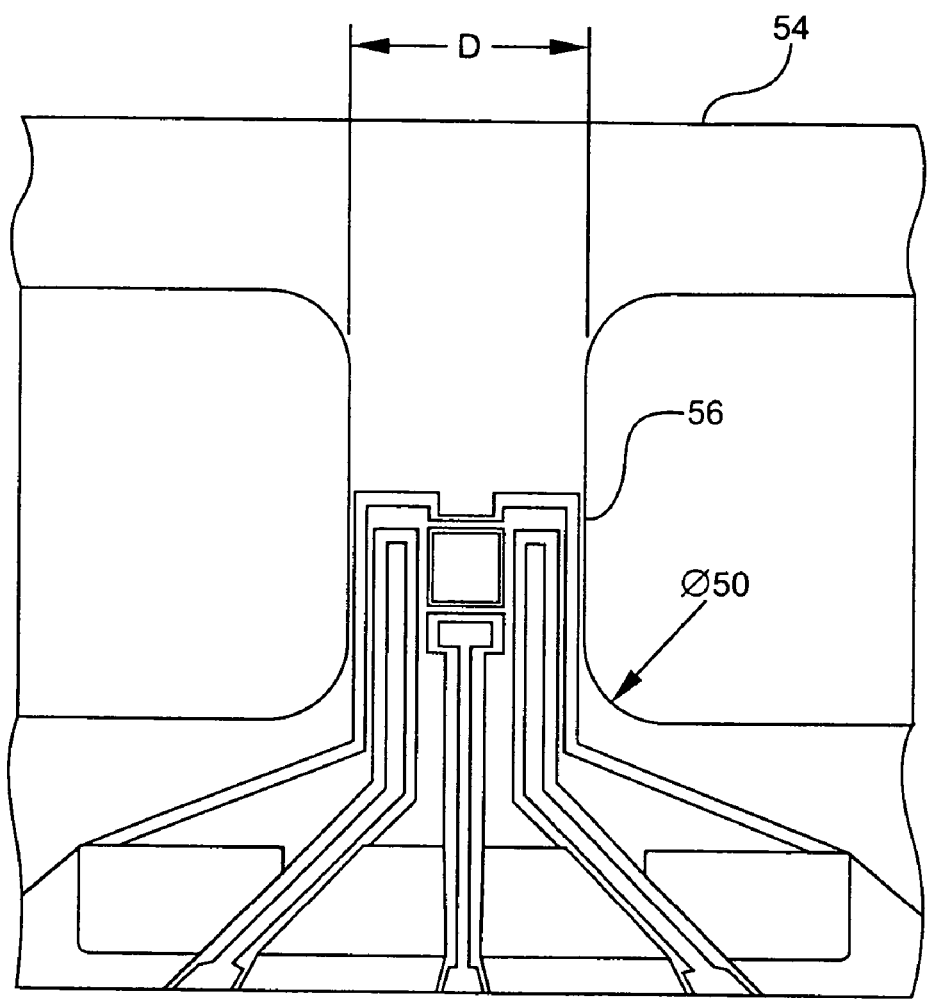
FIG. 12 is a magnified view of an actual layout of a support member for the flow sensor formed in accordance with the present invention.

The overall length and width of the flow sensor in the preferred embodiment, as indicated by dimension B, is approximately 5 mm. The flow sensor 50 preferably includes a paddle 54 at least partially disposed in the orifice 52. The length and width of the orifice 52 of the preferred embodiment, as indicated by dimension A, is approximately 1 mm. The width of the support member 56 in the preferred embodiment is preferably about 100 μm, as indicated by dimension D in FIG. 12, which shows a magnified view of an actual layout of the support member 56. Each of the dimensions in the preferred embodiment of the flow sensor may be adjusted based upon design choice and/or sensor specifications while remaining within the scope of the present invention.

The surface area of the support member 56 is preferably less than that of the paddle 54 to concentrate the mechanical stress of deflection on the support member 56, and thus increase the sensitivity of the flow sensor 50. The overall size of the flow sensor 50 is preferably determined by the surface area of the paddle 54, which is adjustable in accordance with the needs and or sensitivity required for the specific control task.

Figure 11:
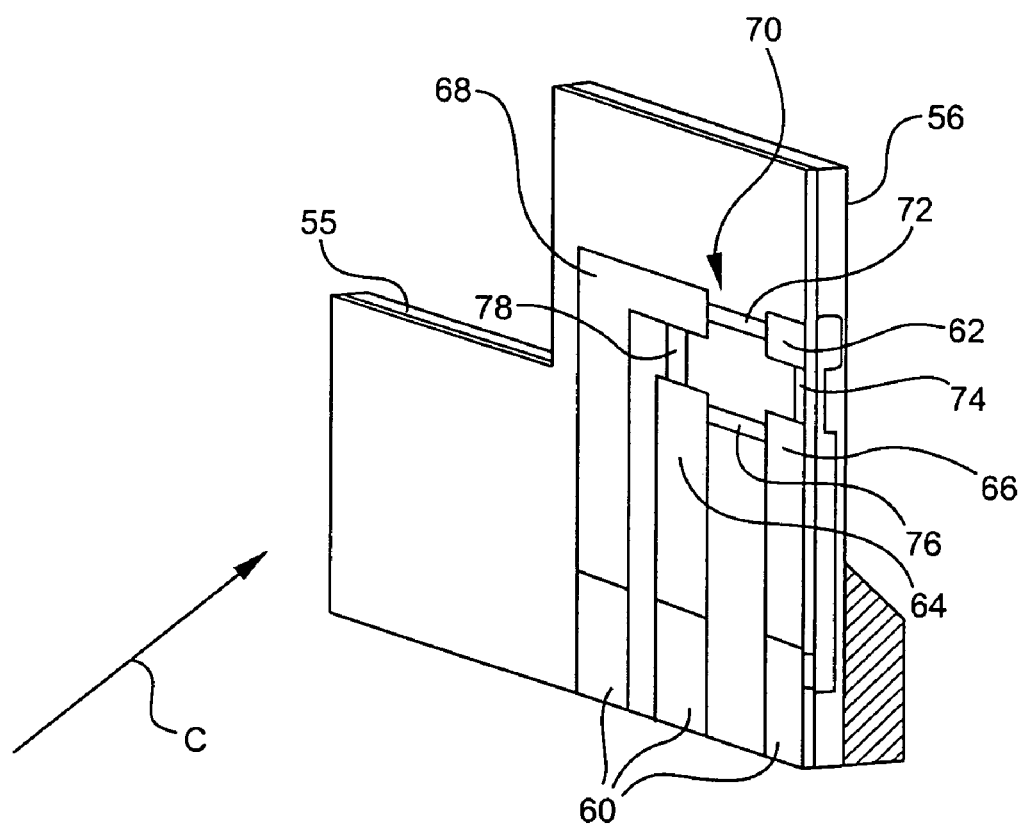
FIG. 11 is an enlarged cross-sectional view of a portion of the flow sensor shown in FIG. 10.

The fluid to be measured is preferably directed through the orifice 52 in the flow sensor 50. The dynamic pressure provided by the fluid preferably deflects the paddle 54, which places mechanical stress on the support member 56. As shown in FIG. 11, the mechanical stress on the support member 56 changes the resistance of piezo-resistive stress gauges 72, 74, 76, and 78 coupled by ohmic contacts or conductors 62, 64, 66, and 68 in a Wheatstone bridge 70 disposed on the support member 56.

This change in resistance creates a corresponding change in voltage, which is preferably provided on one or more electrical contacts or doped regions 60 coupled to the conductors 62, 64, 66, and 68, which are shown in greater detail in the exploded view of the support member 56 in FIG. 11. The strain gauges 72 and 76 are preferably subjected to transverse stress in response to deflection of the paddle 54. The strain gauges 74 and 78 are preferably subjected to longitudinal stress in response to deflection of the paddle 54.

The output voltage of the Wheatstone bridge 70 is preferably proportional to the square of the volumetric flow rate; The sensitivity of the flow sensor 50 depends on the size of the orifice 52 and the size or surface area of the paddle 54, both of which are adjustable over a broad range. Thus, since the paddle 54 is preferably perpendicularly oriented to the direction of fluid flow, which is indicated by arrow C in FIGS. 10 and 11, as fluid passes through the orifice, the kinetic pressure of the fluid induces a mechanical stress on the support member 56. This mechanical stress is preferably detected by the piezo-resistive stress gauges or resistors 72, 74, 76, and 78 in the Wheatstone bridge 70.

The stress gauges 72, 74, 76, and 78 are preferably exclusively disposed on the support member 56. The paddle 54 is preferably used exclusively for its mechanical resistance to fluid flow without any passive or active electronic components disposed thereon. Thus, the flow sensor 50 formed in accordance with a preferred embodiment of the present invention is preferably a two-part flow sensor including a standardized support member 56, which can be generically used for all such flow sensors, and a customizable paddle 54, which may be dimensionally tailored to the sensitivity requirements of a specific application without substantially changing the overall manufacturing process of the flow sensor 50.

Further, since the flow sensor 50 formed in accordance with the present invention preferably includes a full Wheatstone bridge to achieve optimal signal output and sensitivity, both positive and negative deflections must be detected by the strain gauges 72, 74, 76, and 78. Wire or foil strain gauges merely exhibit sensitivity to longitudinal stress, and thus must be disposed on both the front and rear faces, of the stressed component to detect the positive and negative deflections required by the full Wheatstone bridge. However, use of piezo-resistive stress gauges 72, 74, 76, and 78 in the flow sensor 50 formed in accordance with the present invention, which are able to detect both longitudinal and transverse stress, enable the full Wheatstone bridge 70 to be disposed on only one side of the support member 56, which significantly simplifies and reduces the cost of manufacturing the flow sensor 50 in accordance with the present invention.

From the foregoing description, it will be appreciated that the integrated fluid sensing device formed in accordance with the present invention significantly reduces measurement errors, space requirements, external tubing, connectors, fittings, and the cost of installation and maintenance of sensors that measure the physical characteristics of a fluid used to control hydraulic or pneumatic equipment. It will also be appreciated that the integrated fluid sensing device of the present invention enables sensors to be mounted on a single circuit board having common signal processing, communication, error control, and connective circuitry.

Further, it will be appreciated that the integrated fluid sensing device formed in accordance with the present invention is able to readily display and transmit data, which represents physical characteristics of the fluid used to control hydraulic and pneumatic equipment. It will also be appreciated that the integrated fluid sensing device formed in accordance with the present invention substantially encloses sensors that measure the physical characteristics of the fluid and protects these sensors from environmental hazards.

It will also be appreciated that the flow sensor formed in accordance with the present invention can readily be adapted to different flow rates without substantial change or additional cost in the manufacturing process. It will also be appreciated that the flow sensor includes a generic or standardized support member having one or more strain gauges disposed on only one side of the support member and a customizable paddle displaced by fluid flow, which does not include a strain gauge.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A fluid sensing device, the fluid sensing device comprising:
   a fluid flow device including a first mating portion and a second mating portion, the first mating portion including a first aperture, the second mating portion including a second aperture, the first aperture and the second aperture being at least partially aligned such that the first aperture and the second aperture define a channel through the first and second mating portions when the first and second mating portions are joined together, the channel being able to communicate fluid therethrough; and
   a circuit board sandwiched between the first mating portion and the second mating portion, the circuit board including at least one flow sensor, the at least one flow sensor being at least partially aligned with the channel, the at least one flow sensor being able to detect a physical characteristic of the fluid flowing through the channel, the flow sensor including a paddle and a support member, the paddle being at least partially disposed in the channel, the paddle being displaced in response to fluid flowing through the channel, the support member positioning the paddle at least partially in the channel, the support member including a plurality of strain gauges, the plurality of strain gauges being mechanically stressed in response to the paddle being displaced.

2. A fluid sensing device as defined by claim 1, wherein the plurality of strain gauges are disposed on only one side of the support member.

3. A fluid sensing device as defined by claim 1, wherein the fluid flow device includes a valve manifold and a base plate, the base plate being removably coupled to the valve manifold, the base plate including the first mating portion and the second mating portion.

4. A fluid sensing device as defined by claim 1, wherein the first mating portion includes a plurality of first apertures and the second mating portion includes a plurality of second apertures, the plurality of first apertures and the plurality of second apertures being at least partially aligned such that the plurality of first apertures and the plurality of second apertures define a plurality of channels through the first and second mating portions when the first and second mating portions are joined together, the plurality of channels being able to communicate fluid therethrough, the circuit board including a plurality of flow sensors, the plurality of flow sensors being at least partially aligned with the plurality of channels, the plurality of flow sensors being able to detect a physical characteristic of the fluid flowing through the plurality of channels.

5. A fluid sensing device as defined by claim 1, wherein the paddle includes a surface area, the surface area of the paddle being adaptable to provide different displacements of the paddle in response to the fluid flow.

6. A fluid sensing device as defined by claim 1, wherein the paddle includes a first surface area, the support member including a second surface area, the first surface area being unequal to the second surface area.

7. A fluid sensing device as defined by claim 1, wherein the paddle does not have any electrical components mounted thereon.

8. A fluid sensing device as defined by claim 1, wherein the plurality of strain gauges is operatively configured in a Wheatstone bridge.

9. A fluid sensing device as defined by claim 1, wherein at least one of the plurality of strain gauges is responsive to at least one of transverse stress and longitudinal stress.

10. A fluid sensing device as defined by claim 1, wherein at least one of the plurality of strain gauges is piezo-resistive.

11. A fluid sensing device comprising:
at least one valve;
a base plate removably coupled to the at least one valve, the base plate including a first portion and a second portion, the first portion including a first mating surface, the second portion including a second mating surface the base plate including a channel through the first and second portions when the first and second mating surfaces are joined together, the channel being in fluid communication with the at least one value; and
a circuit board sandwiched between the first portion and the second portion, the circuit board including at least one flow sensor, the at least one flow sensor being at least partially aligned with the channel, the at least one flow sensor being able to detect a physical characteristic of the fluid flowing through the channel, the at least one flow sensor including a paddle and a support member, the paddle being at least partially disposed in the channel, a fluid flow being directed through the channel, the paddle being displaced in response to the fluid flow, the support member positioning the paddle at least partially in the channel, the support member including a plurality of strain gauges the plurality of strain gauges being mechanically stressed in response to the paddle being displaced by the fluid flow.

12. A fluid sensing device as defined by claim 11, wherein the plurality of strain gauges are disposed on only one side of the support member.

13. A fluid sensing device as defined by claim 11, wherein the base plate includes a plurality of channels through the first and second portions when the first and second mating surfaces are joined together, the plurality of channels being able to communicate fluid therethrough, the circuit board including a plurality of flow sensors, the plurality of flow sensors being at least partially aligned with the plurality of channels, the plurality of flow sensors being able to detect a physical characteristic of the fluid flowing through the plurality of channels.

14. A fluid sensing device as defined by claim 11, wherein the paddle includes a surface area, the surface area of the paddle being adaptable to provide different displacements of the paddle in response to the fluid flow.

15. A fluid sensing device as defined by claim 11, wherein the paddle includes a first surface area, the support member including a second surface area, the first surface area being unequal to the second surface area.

16. A fluid sensing device as defined by claim 11, wherein the paddle does not have any electrical components mounted thereon.

17. A fluid sensing device as defined by claim 11, wherein the plurality of strain gauges is operatively configured in a Wheatstone bridge.

18. A fluid sensing device as defined by claim 11, wherein at least one of the plurality of strain gauges is responsive to at least one of transverse stress and longitudinal stress.

19. A fluid sensing device comprising:
at least one valve including at least one duct and a substantially flat first mating surface;
a base plate removably coupled to the at least one valve, the base plate having a second mating surface, the base plate including at least one channel in fluid communication with the at least one duct; and
a circuit board sandwiched between the first mating surface of the valve and the second mating surface of the base plate, the circuit board comprising at least one flow sensor, the at least one flow sensor being at least partially aligned with at least one of the duct and the channel, the at least one flow sensor being able to detect a physical characteristic of a fluid flowing therethrough, the at least one flow sensor including a paddle and a support member, the paddle being at least partially aligned with at least one of the duct and the channel, a fluid flow being directed through the channel, the paddle being displaced in response to the fluid flow, the support member positioning the paddle, the support member including a plurality of strain gauges, the plurality of strain gauges being mechanically stressed in response to the paddle being displaced by the fluid flow.

20. A fluid sensing device as defined by claim 19, wherein the plurality of strain gauges is disposed on only one side of the support member.

21. A fluid sensing device as defined by claim 19, wherein the at least one valve includes a plurality of ducts, the base plate including a plurality of channels in fluid communication with the plurality of ducts, the circuit board comprising a plurality of flow sensors at least partially aligned with the plurality of ducts and the plurality of channels.

22. A fluid sensing device as defined by claim 19, wherein the paddle includes a surface area, the surface area of the paddle being adaptable to provide different displacements of the paddle in response to the fluid flow.

23. A fluid sensing device as defined by claim 19, wherein the paddle includes a first surface area, the support member including a second surface area, the first surface area being unequal to the second surface area.

24. A fluid sensing device as defined by claim 19, wherein the paddle does not have any electrical components mounted thereon.

25. A fluid sensing device as defined by claim 19, wherein the plurality of strain gauges is operatively configured in a Wheatstone bridge.

26. A fluid sensing device as defined by claim 19, wherein at least one of the plurality of strain gauges is responsive to at least one of transverse stress and longitudinal stress.

* * * * *